Patented Sept. 17, 1929

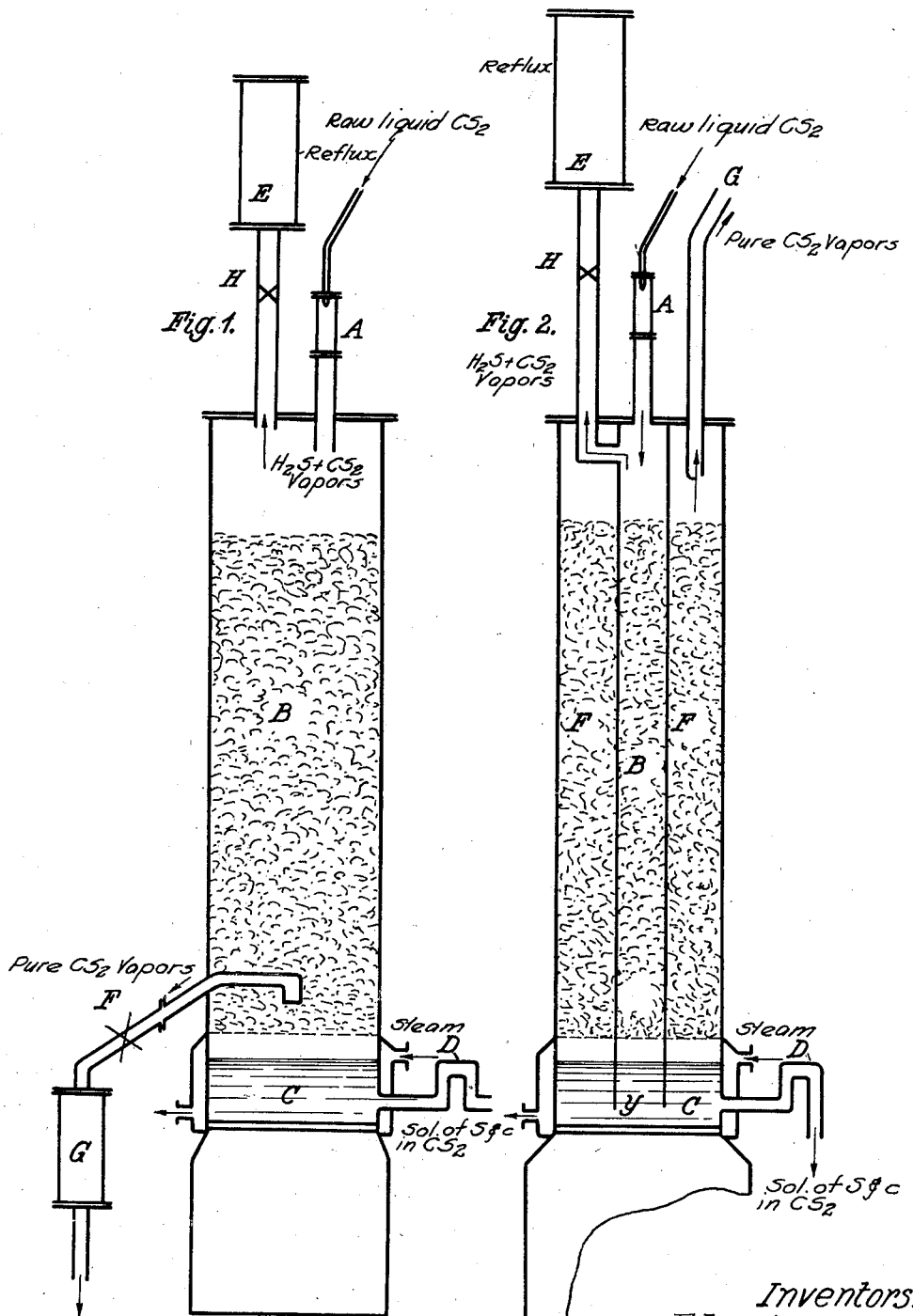

1,728,686

UNITED STATES PATENT OFFICE

EBERHARD LEGELER AND PAUL ESSELMANN, OF PREMNITZ, WESTHAVELLAND, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS FOR THE CONTINUOUS PURIFICATION OF CRUDE CARBON DISULPHIDE

Application filed December 7, 1925, Serial No. 73,926, and in Germany July 6, 1925.

This invention relates to improvements in or modifications of the process for the continuous purification of crude carbon disulphide disclosed in Patent No. 1,672,948, granted June 12, 1928. According to claim 1 of the said specification the carbon disulphide is freed from hydrogen sulphide by counter-current contact with carbon disulphide vapours, after which the sulphur and sulphur compounds are withdrawn from the carbon disulphide in the form of a highly concentrated solution, for example by chemical purification by means of lyes or acids.

It has now been found that the sequence indicated in the case of the above process is not unconditionally necessary for attaining success. Even in the vessel in which the hydrogen sulphide is removed by counter-current contact with carbon disulphide vapours it is possible in the lower part of the column to draw off the carbon disulphide vapours which are completely free from hydrogen sulphide and after condensation of these vapours a carbon disulphide is obtained which by purification with lye or acid now accrues in a completely pure form.

In the accompanying drawing Figs. 1 and 2 show two forms of apparatus suitable for carrying out the invention are diagrammatically illustrated in sectional elevation.

The method of working of the tower illustrated in Fig. 1 corresponds in general to that indicated in U. S. patent application Serial No. 22,981, only a concentrated solution of sulphur in carbon disulphide accumulates gradually at C, as carbon disulphide vapours are continuously withdrawn through F and condensed in a cooler G, the concentrated solution being withdrawn from time to time or continuously through D. It is also possible to insert a carbon disulphide rectifying column in the hydrogen sulphide expelling column, as shown in Fig. 2 the said rectifying column being filled for example with Raschig rings or the like and in this column is then also obtained at the same time a rather thorough freeing of the carbon disulphide from volatile liquid compounds which in the method of working previously described are only removed in the lye or acid vessel employed in a subsequent stage. It is also possible to allow the aforementioned inserted carbon disulphide rectifying column to extend down as far as the liquid surface level of the carbon disulphide in the hydrogen sulphide expelling column in order for example to prevent any priming of hydrogen sulphide. In the lower part of the column there is then located, as previously described, the highly concentrated solution of sulphur in carbon disulphide, which is continuously drawn off in a known manner. The carbon disulphide vapours thus liberated are passed back again into the apparatus or separately condensed and recovered. The method of working of such a tower which is illustrated in Fig. 2 is as follows.

The trickling or rectifying tower B provided with filling bodies is surrounded by a distilling column F which likewise contains filling bodies and which extends right down to the point $y$, within the accumulated carbon disulphide or it may determinate above the surface level of said liquid. The crude carbon disulphide is admitted through A and is freed from hydrogen sulphide as described in the prior application by the pure carbon disulphide vapours ascending from the bottom of the tower which is surrounded with a heating jacket. The hydrogen sulphide escapes through a cooler E, which at the same time has to condense the carbon disulphide vapours carried along with the hydrogen sulphide and return them to the column. The enclosing column F withdraws pure carbon disulphide vapours, which during their long travel while ascending through the filling bodies are still further rectified and accordingly freed from all foreign substances. The vapours escaping through the tube G are as usual condensed in a cooler. Here again a concentrated solution of sulphur in carbon disulphide gradually accumulates at C and is continuously drawn off through D.

It is of course also possible first to evaporate carbon disulphide with hydrogen sulphide in a distillation retort or still and to draw off out of the said retort the aforementioned concentrated solution of sulphur in carbon disulphide, although this process has the disadvantage that the hydrogen sulphide is readily dragged along through the whole of the remainder of the apparatus.

Having now particularly described and ascertained the nature of our said invention and in what manner the same is to be performed, we declare that what we claim is:—

1. A process for the purification of crude carbon disulphide containing $H_2S$ and other sulfur bodies which comprises introducing the liquid crude carbon disulphide into the upper part of a rectification column, heating the solution which collects at the bottom of the column, refluxing the mixture of carbon disulphide vapors and sulfuretted hydrogen escaping from the upper part of the column, withdrawing purified carbon disulphide vapors from a lower part of the column, condensing the same, and withdrawing a concentrated solution of sulfur and sulfur compounds from the bottom of the column.

2. A process for the purification of crude carbon disulphide containing $H_2S$ and other sulfur bodies which comprises introducing the liquid crude carbon disulphide into the upper part of a rectification column, heating the solution which collects at the bottom of the column, refluxing the mixture of carbon disulphide vapors and sulfuretted hydrogen escaping from the upper part of said column, withdrawing purified carbon disulphide vapors from a lower part of said column, passing vapors through a second column which encloses the first-named column, withdrawing the vapors from the upper part of the second column, condensing the said vapors and withdrawing a concentrated solution of sulfur and sulfur compounds from the bottom of the column.

3. A process for the purification of crude carbon disulphide containing $H_2S$ and other sulfur bodies which comprises introducing the liquid crude carbon disulphide into the upper part of a rectification column, heating the solution which collects at the bottom of the column, refluxing the mixture of carbon disulphide vapors and sulfuretted hydrogen escaping from the upper part of the column, withdrawing purified carbon disulphide vapors from a lower part of the column, and withdrawing a concentrated solution of sulfur and sulfur compounds from the bottom of the column.

In testimony whereof we have signed our names to this specification.

DR. EBERHARD LEGELER.
DR. PAUL ESSELMANN.